United States Patent [19]

Yatcilla et al.

[11] 4,078,819
[45] Mar. 14, 1978

[54] APPARATUS FOR FACILITATING LATERAL SHIFTING OF BALER TONGUE

[75] Inventors: George E. Yatcilla, Newton, Kans.; Thomas B. Moody, Perdue, Canada

[73] Assignee: Sperry Rand Corporation, New Holland, Pa.

[21] Appl. No.: 713,328

[22] Filed: Aug. 11, 1976

[51] Int. Cl.² ............................................. B60D 1/00
[52] U.S. Cl. .................................................. 280/462
[58] Field of Search ............... 280/463, 464, 462, 467, 280/468, 474

[56] References Cited

U.S. PATENT DOCUMENTS

| 2,946,603 | 7/1960 | Wald | 280/463 |
|---|---|---|---|
| 2,963,303 | 12/1960 | Young | 280/462 |
| 3,635,494 | 1/1972 | Barkstrom | 280/462 |
| 3,677,565 | 7/1972 | Slosiarek | 280/467 |

Primary Examiner—Joseph F. Peters, Jr.
Assistant Examiner—R. Schrecengost
Attorney, Agent, or Firm—John R. Flanagan; John B. Mitchell; Frank A. Seemar

[57] ABSTRACT

An implement, such as a baler, has a mobile frame, a forwardly extending tongue attachable at its forward end to a vehicle for towing the baler and connected at its rearward end to the frame for lateral movement relative to the frame and improved apparatus for facilitating the lateral shifting of the tongue relative to the frame. A forwardly protruding flange is disposed on the lower forward end of the bale case of the baler frame. The improved apparatus includes a wear plate which is replaceably attached to the bottom side of the bale case flange and a roller element mounted on the portion of the tongue which underlies the wear plate. The roller element maintains the wear plate in spaced relationship above the tongue while at the same time provides load-bearing rolling contact with the wear plate. The roller element is cylindrical in shape and rotatably mounted on a shaft element. The shaft element is mounted within the hollow interior of the tongue below an opening formed in the upper side of the tongue such that an upper circumferential portion of the roller element extends upwardly through the opening and above the upper side of the tongue to where the roller element makes the rolling contact with the wear plate.

10 Claims, 6 Drawing Figures

APPARATUS FOR FACILITATING LATERAL SHIFTING OF BALER TONGUE

BACKGROUND OF THE INVENTION

1. Field of the Invention

The present invention generally relates to an implement of the type having a mobile frame with a forwardly extending laterally shiftable tongue utilized for towing the implement both in field operation and road transport and, more particularly, is concerned with improved apparatus for facilitating quick and easy lateral shifting of the tongue relative to the frame in setting up the implement for either field operation or road transport.

2. Description of the Prior Art

The present invention provides apparatus for facilitating the lateral shifting of the tongue of an implement, such as a hay baler, which constitutes an improvement over that disclosed and illustrated in U.S. Pat. No. 2,963,303 which issued Dec. 6, 1960 to Robert G. Young and James H. Hollyday and is assigned to the same assignee as the present invention.

The prior art wheel braking arrangement disclosed in the aforesaid patent for facilitating the lateral shifting of the tongue includes a brake or lock mechanism associated with the right wheel of the baler and a cable which may be pulled by the operator to operate the mechanism. Specifically, the cable extends from the front of the baler at the tongue latching mechanism forwardly to within the reach of the operator. Then, it extends about an idler mounted near the forward end of the tongue and rearwardly along the tongue to an idler mounted at the rear end of the tongue. From about the rear idler, the cable extends transversely across the baler along the transverse frame member which mounts the wheels to the brake mechanism. The end of the cable is attached to a lever for reciprocably moving a latch pin of the brake mechanism.

When the operator pulls forwardly on the cable, two things happen which facilitate shifting of the tongue. First, the tongue is unlatched from the front end of the baler frame and, second, the right wheel of the baler is braked. Then, while holding forward on the cable, if the operator merely drives the tractor either forwardly or rearwardly (depending upon which way the operator wants to shift the tongue), he will be able to impose sufficient force on the tongue so as to correspondingly move the baler and cause it to turn or pivot about its braked right wheel and also relative to the tongue which, in effect, laterally shifts the tongue relative to the baler.

When all of the components of this prior art arrangement are properly adjusted, such method of shifting the tongue is highly satisfactory. However, maintaining proper adjustment of the arrangement is somewhat troublesome and time consuming. Also, the area of the tongue which supports the forward end of the baler experiences the highest loads and consequently considerable expense is required to provide sufficient structural reinforcement to withstand loading and wear in that area.

SUMMARY OF THE INVENTION

The improved apparatus of the present invention for facilitating the lateral shifting of the tongue relative to the baler frame obviates the aforementioned problems of maintaining proper component adjustment and of excessive loading of the tongue. The improved apparatus eliminates all of the components except for a tongue latching mechanism; therefore, no adjustments need be provided, the tongue is less cluttered with extra components and a more inexpensive arrangement is the result. At the same time, the ability to quickly and easily laterally shift the tongue which was achieved by the prior art wheel braking arrangement, is retained by the improved apparatus of the present invention.

Accordingly, the present invention relates to improved apparatus for facilitating the lateral shifting of the tongue on an implement of the type, such as a baler, having a mobile frame, the tongue extending forwardly from the frame and attachable at its forward end to a vehicle for towing the implement, means connecting a rearward end of the tongue to the frame for lateral movement relative to the frame and support means on a forward end of the frame overlying a portion of the tongue located between the ends thereof. The improved apparatus comprises means, preferably in the form of a cylindrical roller element, mounted on the tongue portion under the support means and engaged therewith for maintaining the same in spaced relationship above the tongue while at the same time providing load-bearing rolling contact therewith. Also, the support means on the forward end of the frame includes a replaceable wear plate which is engaged with the roller element. Furthermore, the wear plate may be reversed for further use prior to being replaced.

More particularly, the portion of the tongue which underlies the wear plate is preferably hollow and includes an upper wall having an opening formed therein. The roller element is rotatably mounted to the tongue generally below the upper wall thereof so as to extend upwardly through the opening in the wall and above the wall to where the roller element makes rolling contact with the wear plate. Furthermore, the roller element is mounted on a shaft element which is seated within upwardly-opening recesses defined on spaced apart brackets connected to the tongue within the hollow interior thereof such that the shaft element and the roller element therewith may be readily removed from the tongue upwardly through the opening in the upper wall thereof.

Still further, the mechanism for releasably latching the tongue to the forward portion of the frame is mounted on the tongue so as to overlie part of the opening in the tongue while leaving another part of the opening exposed at one side of the mechanism. The roller element being mounted in the opening and below the latching mechanism is removable from the tongue upwardly through the exposed part of the opening.

Other advantages and attainments of the improvement provided by the present invention will become apparent to those skilled in the art upon a reading of the following detailed description when taken in conjunction with the drawings in which there is shown and decribed an illustrative embodiment of the invention.

BRIEF DECRIPTION OF THE DRAWINGS

In the course of the following detailed description reference will be frequently made to the attached drawings in which.

DETAILED DESCRIPTION OF THE INVENTION

In the following description, right hand and left hand references are determined by standing at the rear of the machine and facing in the direction of forward travel. Also, in the following description, it is to be understood that such terms as "forward," "left," "upwardly," etc., are words of convenience and are not to be construed as limiting terms.

In General

Figure 1:
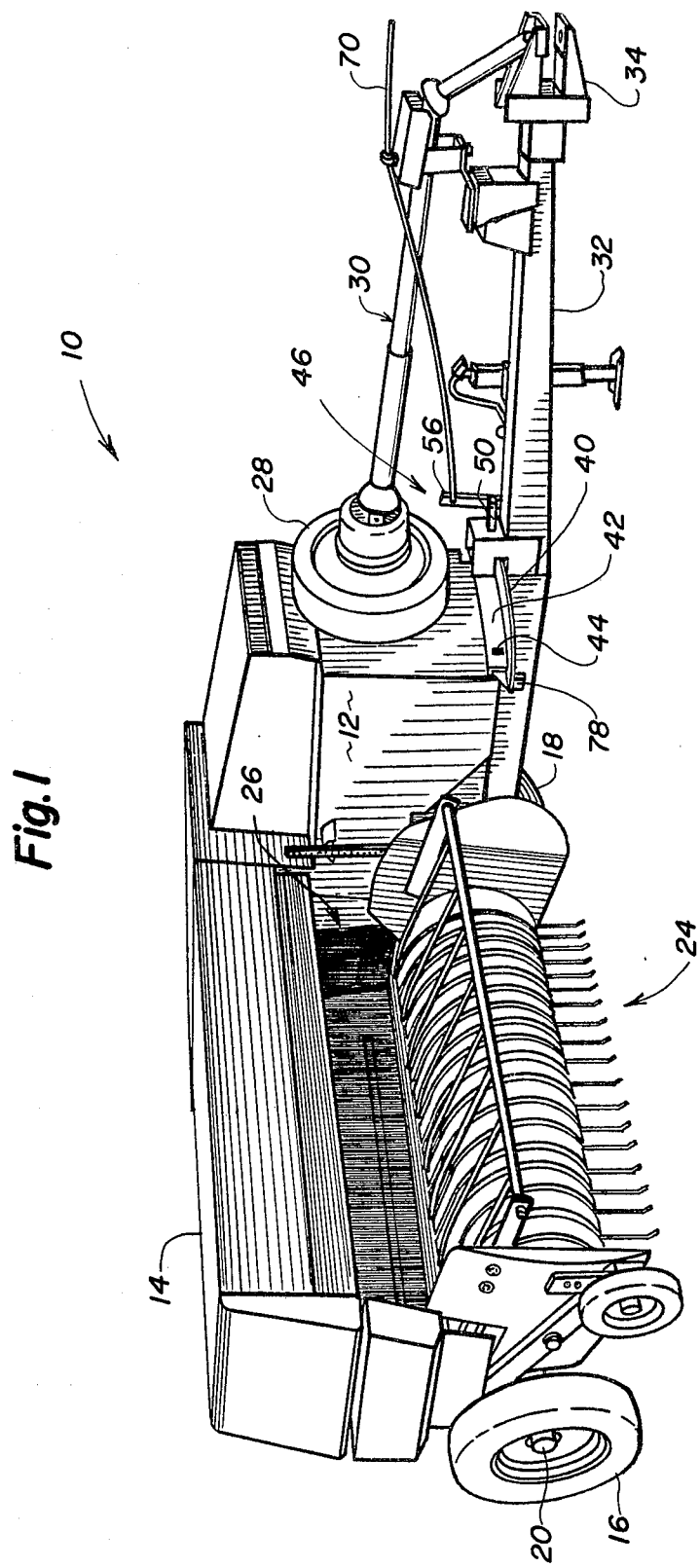
FIG. 1 is a perspective view of a baler embodying the principles of the present invention.

Referring now to the drawings, and particularly to FIG. 1, there is shown a hay baler, being indicated generally by numeral 10. The baler 10 includes a frame being comprised by a fore-and-aft extending bale case 12 at its left side and a feeder housing 14 transversely mounted adjacent the right side of the bale case 12. The frame is supported and made mobile by right and left ground-engaging wheels 16,18 rotatably mounted on right and left spindles (only the right one 20 being shown), being connected to and extending outwardly from respective opposite ends of a transverse frame member 22 (being fragmentarily shown in FIGS. 2 and 3).

A pickup assembly 24 is mounted on the frame forwardly of and below the feeder housing 14 and adapted to lift crop material from the field and deliver it to the feeder housing 14. A feeding mechanism (not shown) is mounted within the feeder housing 14 for conveying the crop material received in the housing 14 into the bale case 12 through an inlet opening 26 formed in the right vertical side of the bale case 12. A plunger (not shown) is mounted for reciprocable movement in the bale case 12 for forming the crop material conveyed therein through inlet opening 26 into rectangular bales. As the bales are formed in the bale case 12, they move progressively toward the rear end of the bale case 12. After each bale is completed, it is banded with a suitable typing medium and, subsequently, emerges from the rear or discharge end of the bale case 12.

For providing rotary power to the pickup 24, feeding mechanism and plunger as well as other operating mechanism of the baler 10, a flywheel 28 is rotatably mounted to the forward end of the bale case 12 and connected with power transmitting components (not shown) which interconnect the flywheel 28 to the various operating mechanisms. An input driveline, generally designated by numeral 30, being connected at its rear end to the baler flywheel 28, is adapted for connection at its forward end to the power takeoff (pto) shaft of the tractor (not shown) for rotation in unison therewith to supply rotary driving power to the flywheel 28.

Baler Tongue and Mechanism for Latching Tongue to Baler Frame

Figure 2:
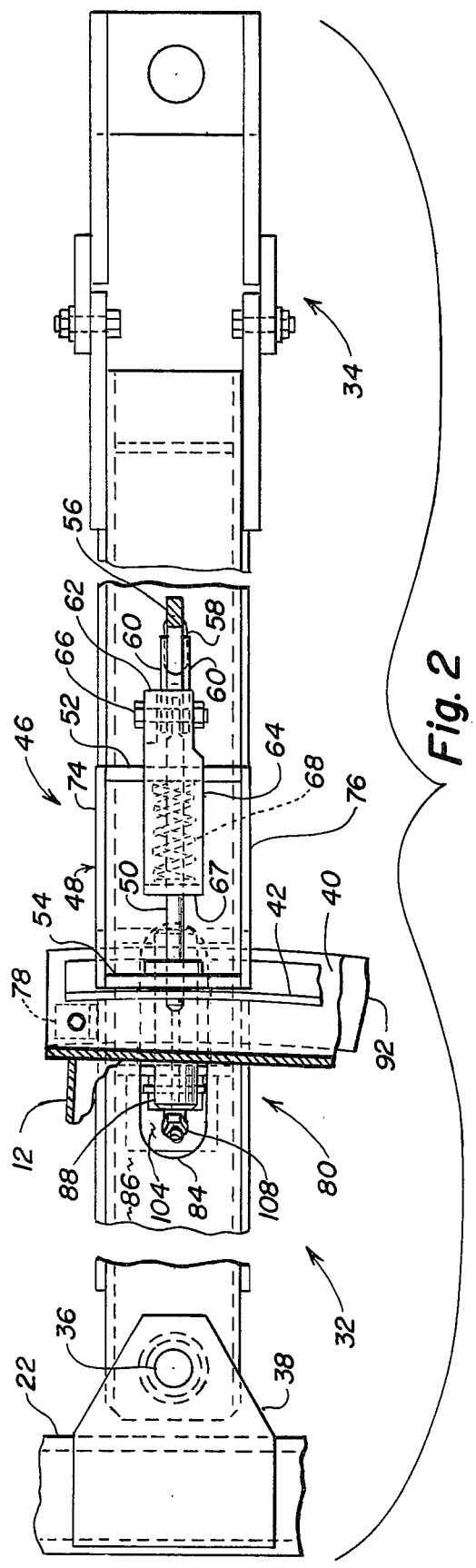
FIG. 2 is an enlarged, fragmentary top plan view of the implement tongue, the lower front portion of the bale case and the tongue latching mechanism, showing
Figure 3:
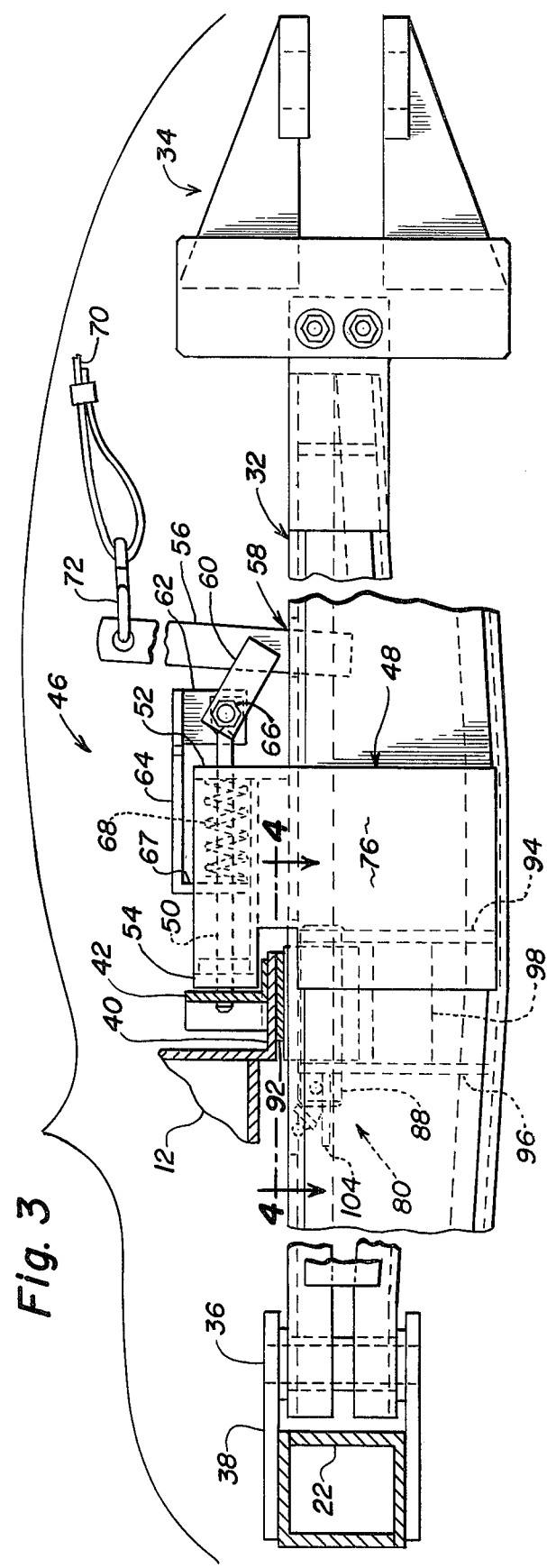
FIG. 3 is a side elevational view of FIG. 2.

The baler 10 is adapted to be connected to a tractor (not shown) for towing the baler either in field operation or road transport by means of a forwardly extending tongue 32. The tongue 32 is of a hollow construction and has a hitch member 34 at its forward end adapted to be articulately connected to the drawbar of the tractor. The rearward end of the tongue 32 is pivotally connected by pin 36 to a bracket 38 affixed to the transverse frame member 22 (FIGS. 2 and 3). The tongue 32 is swingable laterally about the vertical axis of the pin 36 and relative to the baler frame.

The baler tongue 32 is laterally shiftable between positions located respectively adjacent the outboard and inboard sides of the bale case 12 and may be connected to the bale case 12 when it is in either of such positions. The tongue 32 is shifted to the outboard position, such as seen in FIG. 1, when setting up the baler for field operation, while it is shifted to the inboard position to set up the baler 10 for road transport. When the tongue is in the outboard position, the feeder housing 14 and pickup assembly 24 of the baler 10 are generally disposed in a position offset to the right of the tractor, whereby the tractor will not run over the windrowed crop material which will be delivered by the pickup to the feeder housing. When the tongue is in the inboard position, the baler 10 trails substantially directly behind the tractor.

Means is provided on the bale case 12 for defining the inboard and outboard positions of the tongue 32. Specifically, protruding forwardly from the lower forward end of the bale case 12 is a horizontal support flange or plate 40 having a vertical face plate 42 affixed to the top side of the plate 40, therealong at a location rearwardly displaced from its forward edge. A hole 44 formed through the right end portion of the face plate 42 defines the inboard position of the tongue 32, while another hole (not shown) formed through the left end portion of the face plate 42 defines the outboard position thereof. The vertical face plate 42 and the forward edge of the horizontal support plate 40 each have a curvature which is coincident with the lateral path along which the adjacent portion of the tongue 32 moves when the tongue 32 is laterally shifted between the inboard and outboard positions.

A mechanism for releasably latching the tongue 32 to the baler frame, being indicated generally by the numeral 46, is mounted on the tongue 32 immediately forwardly of the forward end of the bale case 12. The mechanism 46 includes a box-like structure 48 mounted on the tongue 32 adjacent the plate 40 with a latch pin 50 mounted on the structure 48 for horizontal reciprocatory movement toward and away from the face plate 42. Specifically, holes are respectively formed in the front and rear walls 52,54 of the structure 48 through which the latch pin 50 extends in alignment with either the inboard position hole 44 or the outboard position hole when the tongue has been shifted to either respective position.

The mechanism 46 further includes a generally vertical lever arm 56 pivotally mounted at 58 on the tongue 32 adjacent the front wall 52 of the box-like structure 48. A pair of spaced apart tabs 60 are fixed to respective opposite sides of the lever arm 56 and extending rearwardly therefrom. The tabs 60 receive therebetween the forward end of the latch pin 50 and side-by-side thereto a tab 62 depending from the underside of one end of a bracket 64. A fastener 66 is received through holes formed in the tabs 60 which are aligned with holes respectively formed in the tab 62 and the forward end of the latch pin 50. In such manner, the bracket 64 and latch pin 50 is pivotally connected to the lever arm 56. The bracket 64 extends rearwardly above the front wall 52 of the box-like structure 48 to a depending rear tab 67 which has a hole formed therein through which the latch pin 50 extends.

A spring 68 is positioned about the latch pin 50 and disposed between the rear face of the front wall 52 of structure 48 and the front face of the depending rear tab 67 of the bracket 64. In its normal condition, the spring 68 urges the bracket 64 rearwardly such that the bracket, in turn, normally assumes a position which disposes the lever arm 56 in a nearly vertical attitude and the latch pin 50 with its rear end extending rearwardly past the rear wall 54 of the box-like structure 48 sufficiently enough for the rear end of the latch pin 50 to extend through either the inboard position hole 44 or the outboard position hole of the face plate 42 depending upon where the tongue 32 has been positioned.

A rope 70 which extends forwardly to within the reach of the tractor operator is attached at its rear end to the top of the lever arm 56 by a S-shaped hook 72. Therefore, by merely pulling forward on the rope 70 and then holding it forward, the lever arm 56 is pivoted forwardly and withdraws the rear end of the latch pin 50 from either of the holes in the face plate 42. The tongue 32 is then ready to be shifted between its lateral positions.

To eliminate any possibility for the baler frame to tip rearwardly when the latch pin 50 is withdrawn from the hole of the face plate 42, the rear wall 54 and rear portions of side walls 74,76 of the box-like structure 48 are spaced above the tongue 32 sufficiently enough to receive the front edge portion of the horizontal support plate 40 therebetween. Such position of the plate 40 disposes the vertical face plate 42 closely adjacent the rear face of rear wall 54 of the structure 48. Furthermore, angle-shaped tabs (only the right tab 78 being seen in FIG. 1) are releasably fastened at respective opposite lateral ends of the horizontal support plate 40 for providing stops which limit the extent to which the tongue 32 may be laterally shifted.

The parts of the baler 10 to the extent they have been described up to this point are generally similar to ones known in the prior art and therefore need not be described in any further detail for a complete and thorough understanding of the improvement provided by the present invention which will be described hereinafter.

Improved Apparatus for Facilitating Lateral Shifting of Tongue Relative to Frame The heavy load being imposed on the tongue 32 by the weight of the forward portion of the baler frame does not impede the relative ease with which the tongue 32 may be laterally shifted due to the improved apparatus of the present invention which includes means, generally indicated by 80, mounted on the portion of the tongue 32 underlying the horizontal support plate 40 and maintaining the same in spaced relationship above the tongue 32 while at the same time providing a load-bearing rolling contact therewith.

Means 80 includes a roller element 82, preferably, being cylindrical in shape and mounted with the hollow interior of the tongue 32 generally below an opening 84 which is formed in an upper wall 86 of the tongue below the support plate 40 and the rear portion of the box-like structure 48 of the latching mechanism 46. The roller element 82 has a central bore through which extends a cylindrical shaft element 88 so as to rotatably mount the roller element 82. Mounting means, generally designated as 90, is connected to the aforementioned portion of the tongue within the hollow interior thereof and seatably mounts the shaft element 88 at the opposite end portions thereof which protrude beyond the opposite ends of the roller element, as clearly seen in FIG. 6.

The upper end of the mounting means 90 seats the shaft element 88 at such a spaced position below the upper wall 86 of the tongue and the opening 84 formed therein that an upper cylindrical portion of the roller element 82 extends upwardly through the opening 84 and above the upper wall 86 of the tongue 32 to where the outer surface of the roller element 82 provides load-bearing rolling contact with the underside of a replaceable wear plate 92. The wear plate 92 is detachably fastened adjacent its opposite ends to the bottom side of the support plate 40. Its mounting relationship may be reversed by turning it over once it has incurred a significant degree of wear on one side. The provision of the removable wear plate 92 prolongs the useful life of the roller element 82 and also is an efficient and inexpensive way to avoid any potential problems of structural deterioration in the support plate area on the bale case 12.

Figure 4:
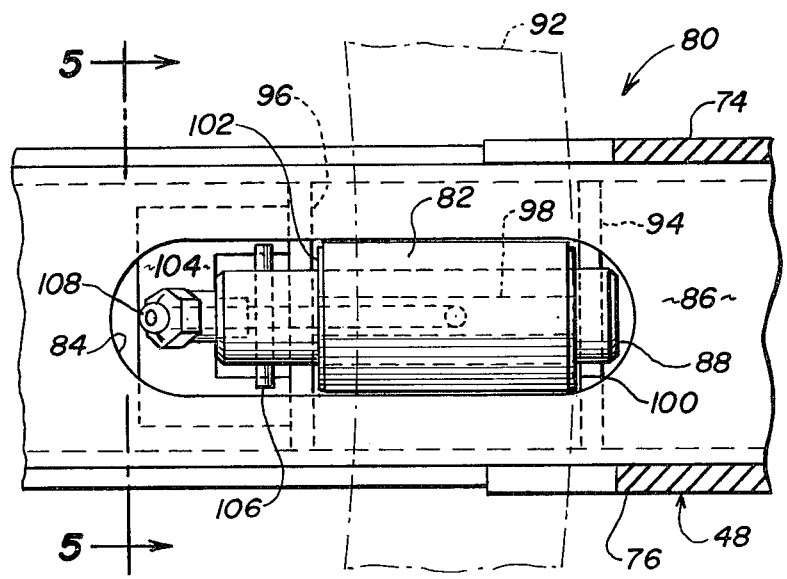
FIG. 4 is a fragmentary top plan view taken along line 4—4 of FIG. 3, but on a somewhat larger scale than that of FIG. 3, showing the roller and shaft elements seated within the opening in the implement tongue and showing the replaceable wear plate in broken line form.
Figure 5:
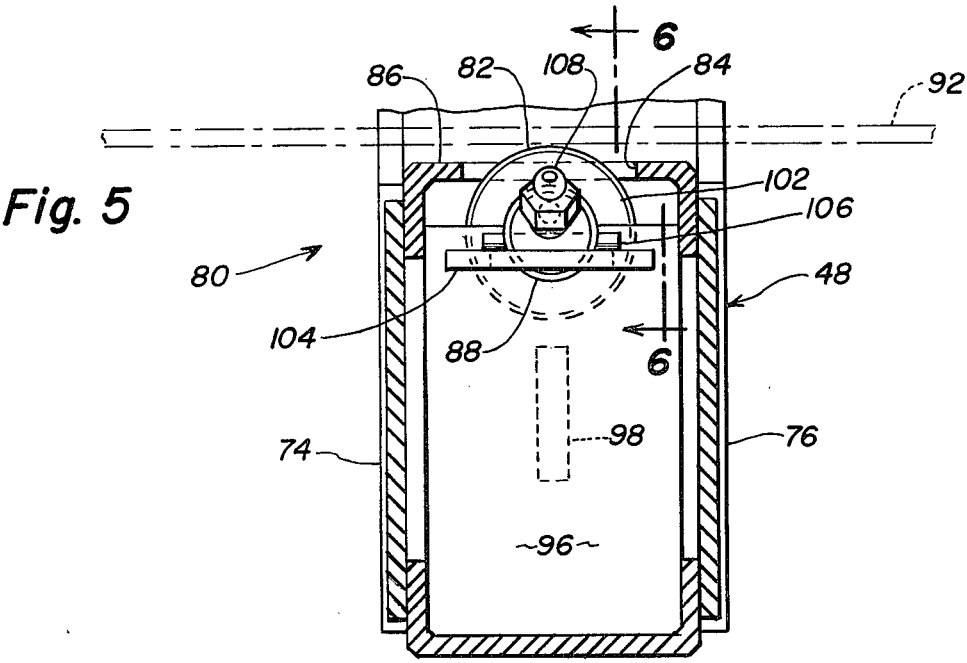
FIG. 5 is a sectional view taken along line 5—5 of FIG. 4.
Figure 6:
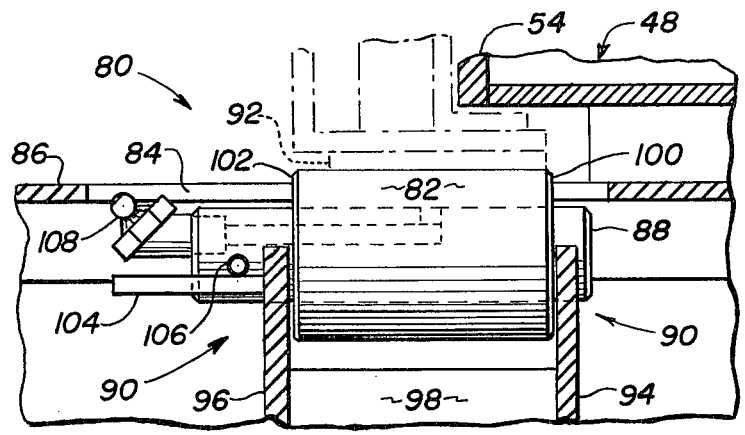
FIG. 6 is a part elevational and part sectional view taken along line 6—6 of FIG. 5.

As seen in FIGS. 4 through 6, the mounting means 90 for the roller and shaft elements 82,88 includes a pair of vertically-disposed, fore-and-aft spaced apart plate-like brackets 94,96 which extend transversely across the hollow interior of the tongue 32. The upper horizontal edge of each bracket is spaced below the upper wall 86 of the tongue and has an upwardly-opening recessed area, semi-cylindrical in shape, defined thereon within which one of the opposite end portions of the shaft element 88 is seated. A fore-and-aft extending bracket 98 interconnects the facing surfaces of the brackets 94,96. The roller element 82 is positioned about the shaft element 88 between the two brackets 94,96 with washers 100,102 on the shaft element 88 respectively positioned between the brackets and the opposite ends of the roller element 82.

Means are associated with the rear end portion of the shaft element 88 and the rear surface of the rear one of the brackets 96 which combine to substantially restrain the shaft from undergoing both rotational movement and fore-and-aft axial movement relative to the brackets whenever the roller element 82 is rotated due to lateral shifting of the tongue. Such means includes a generally horizontal U-shaped flange 104, being fixed to the rear surface of rear bracket 96 and below the top edge thereof, which extends rearwardly so as to encompass the rear end portion of the shaft element 88 to thereby prevent it from being displaced rearwardly. Referring to FIG. 6, it will be seen that flange 104 extends about the rear end portion of shaft element 88 below a horizontal plane extending through the middle of the element 88. Therefore, the flange 104 offers no obstruction to the removal of the shaft element 88 in an upwardly direction from the brackets 94,96. For restraining the shaft element 88 from the possibility of being displaced forwardly or undergoing rotation, the opposite end portions of a pin 106, being received through a transverse bore in the shaft element 88, protrude outwardly above the top surface of the flange 104 and also rearwardly of the rear surface of the top portion of the rear bracket 96. The latter pin 106, as in the case of the flange 104, offers no obstruction to the removal of the shaft element 80 (and of roller element 82 therewith) upwardly from its seated position.

Finally, the opening 84 in the tongue upper wall 86 although partially disposed under the box-like structure 48 also has a part which extends rearwardly of one side of the structure 48 (and the wear plate 92 and thus support plate 40 which mounts the plate 92) so as to be exposed and through which the roller and shaft elements 82,88 may be removed. A lubrication inlet fitting or zerk 108, as seen in FIG. 6, is installed on the rear end of the shaft element 88 and access thereto may be gained through the exposed part of the opening 84. If the front end of the bale case is supported by a jack and one of the angle-shaped stop tabs 78 is removed, the tongue 32, when unlatched from the face plate 42, may be shited beyond or past the respective inboard or outboard position. In such position of the tongue 32, the roller and shaft elements 82,88 may be installed or replaced in the tongue 32 through the exposed part of the opening 84 therein. However, since the bottom of the front portion of the bale case 12 is open, lubrication may be supplied through the zerk 108 without laterally displacing the tongue 32 beyond either side of the bale case 12.

In summary, the rolling contact provided between the wear plate 92 on the bale case front end and the roller element 82 mounted in a recessed position in the tongue facilitates easy shifting of the tongue 32 between its field operation outboard position and its road transport inboard position. By merely holding forward on the rope to maintain the mechanism 46 unlatched from the face plate 42 and then by carefully and slowly backing up the tractor or driving it forward, the operator may readily shift the tongue 32 laterally to the inboard position or outboard position. Once the desired position is reached the rope is released and the mechanism 46 again latches to the face plate 42 at the respective one of the holes formed therein to lock the tongue 32 at such position. Additionally, it is desirable to provide another hole inwardly of, but adjacent to, the previously-defined outboard position hole so as to provide a second field operation position for the baler relative to a tractor having a somewhat different width.

While the improved apparatus of the present invention has been described in connection with a hay baler it could be used with many other farm implements, such as forage harvesters, mower-conditioners, etc. wherein shifting of a tongue between field operation and road transport positions is oftentimes provided for.

It is thought that the improved apparatus of the present invention and many of its attendant advantages will be understood from the foregoing description and it will be apparent that various changes may be made in the form, construction and arrangement of the parts described without departing from the spirit and scope of the invention or sacrificing all of its material advantages, the form hereinbefore described being merely an exemplary embodiment thereof.

Having thus described the invention, what is claimed is:

1. In an implement having a mobile frame, a forwardly extending tongue attachable at its forward end to a vehicle for towing said implement, means connecting a rearward end of said tongue to said frame for lateral movement relative to said frame and support means on a forward end of said frame overlying a portion of said tongue located between said ends thereof, improved apparatus for facilitating the lateral shifting of said tongue relative to said frame, wherein:
   said portion of said tongue includes an upper wall having an opening formed therein which underlies said support means; and
   a roller element rotatably mounted to said tongue generally below said upper wall so as to extend upwardly through said opening therein and above said upper wall for maintaining said support means above said tongue while at the same time providing load-bearing rolling contact therewith, and at least said portion of said tongue has a hollow interior within which said roller element is mounted, and said roller element is cylindrical in shape.

2. An implement as recited in claim 1, wherein said support means includes a replaceable wear plate engaged with said load-bearing rolling contact-providing means.

3. An implement as recited in claim 2, wherein said wear plate may be reversed for further use prior to being replaced.

4. An implement as recited in claim 1, wherein:
   mounting means is connected to said portion of said tongue below said opening in said upper wall thereof;
   a shaft element is seated on said mounting means so as to be removable upwardly through said opening; and
   said roller element is rotatably mounted on said shaft element.

5. An implement as recited in claim 4, wherein said shaft element has a lubrication inlet fitting attached thereto which is accessible through said opening.

6. An implement as recited in claim 4, wherein said mounting means comprises spaced apart brackets having upwardly-opening recessed areas defined thereon within which said shaft element is seated.

7. An implement as recited in claim 6, wherein said roller element is rotatably mounted about said shaft between said spaced apart brackets.

8. An implement as recited in claim 6, wherein:
   said shaft element has one end portion which extends beyond one of said brackets; and
   means is provided in association with said one bracket and said one end portion of said shaft element which substantially restrains said shaft from undergoing both axial and rotational movements relative to said brackets.

9. In an implement having a mobile frame, a forwardly extending tongue attachable at its forward end to a vehicle for towing said implement, means connecting a rearward end of said tongue to said frame for lateral movement between first and second positions relative to said frame and means mounted on a portion of said tongue located between said ends thereof for releasably latching said tongue to a forward portion of said frame in either of said positions, improved apparatus for facilitating the lateral shifting of said tongue relative to sad frame between said positions, wherein:
   said portion of said tongue includes an upper wall having an opening formed therein which at least partially underlies said releasable latching means and is exposed at one side thereof; and
   load-bearing roller contact-providing means mounted on said portion of said tongue under said releasable latching means and engageable with said forward portion of said frame, said load-bearing roller contact-providing means including a roller element being mounted to said tongue generally below said upper wall so as to extend upwardly through said opening therein and above said upper wall to where said roller element makes rolling contact with said forward portion of said frame.

10. An implement as recited in claim 9, wherein said roller element is mounted so as to be removable upwardly through the exposed part of said opening.

* * * * *